June 21, 1932.　　　J. P. CANNON　　　1,863,562
BELT CONSTRUCTION AND METHOD OF USE
Filed Oct. 5, 1929
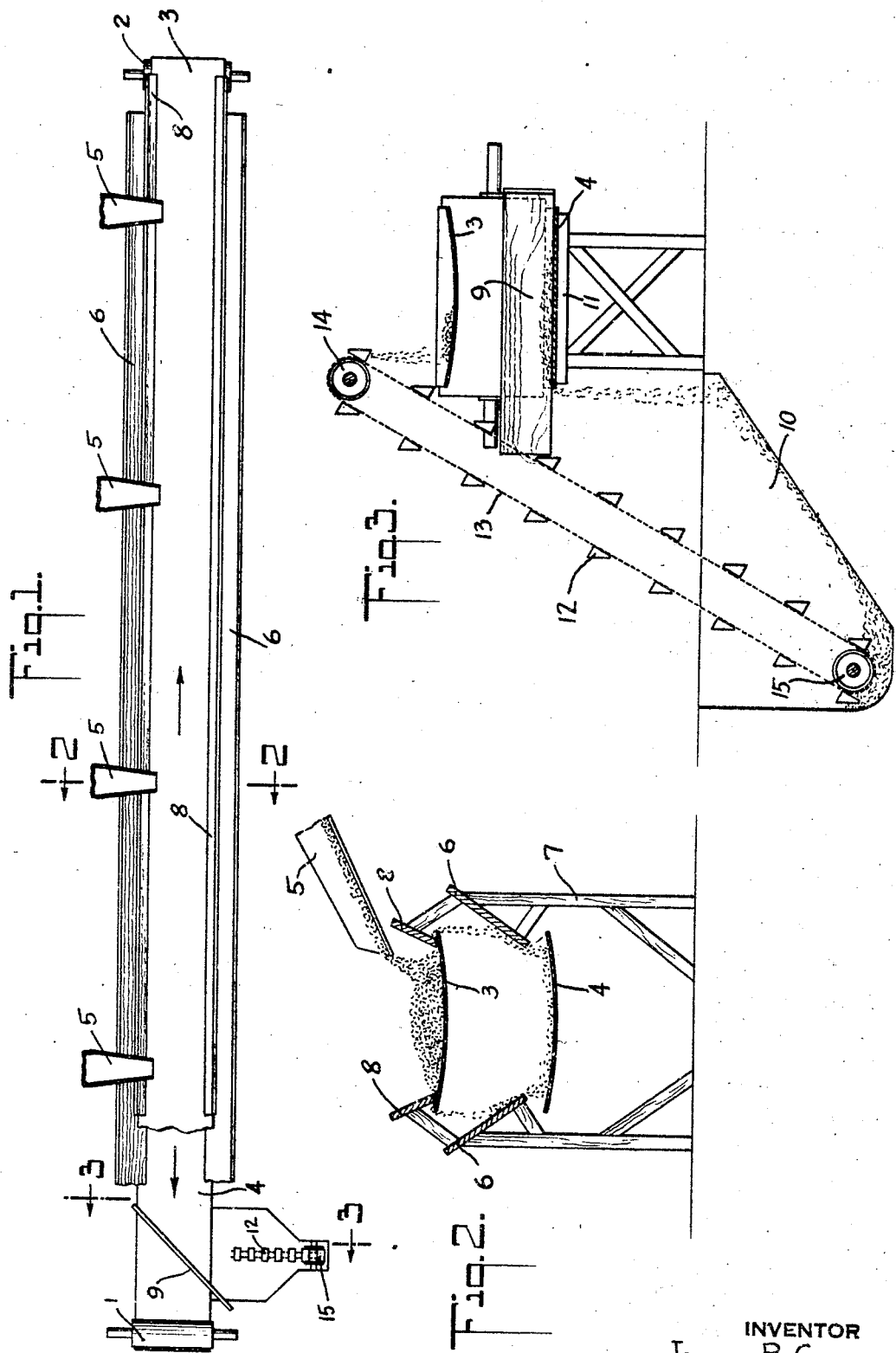
INVENTOR
James P. Cannon
BY
ATTORNEY Patented June 21, 1932

1,863,562

UNITED STATES PATENT OFFICE

JAMES P. CANNON, OF ELIZABETH, NEW JERSEY, ASSIGNOR TO STRUCTURAL GYPSUM CORPORATION, OF LINDEN, NEW JERSEY, A CORPORATION OF DELAWARE

BELT CONSTRUCTION AND METHOD OF USE

Application filed October 5, 1929. Serial No. 397,581.

This invention relates to a method of and means for preventing the loss by spillage of material of a loose or pulverulent condition from the top portion of a conveyer belt.

In the arts it is a very common practice to convey material from one point to another by depositing the same upon the top portion of an endless belt. Even though this belt is somewhat dished, it frequently happens that the material works toward the edges thereof and spills to the floor so that this amount of material is lost or else must be periodically swept up. The latter procedure has the disadvantage of causing the material to become contaminated with dirt and other refuse located on the floor, which in many instances is detrimental to the quality of the material.

It is among the objects of this invention to so handle spilled material from the top portion of an endless belt to insure its being automatically returned thereto without contamination with dirt or other foreign matter and without attention on the part of workmen. In this manner the conveyer operates with maximum delivering efficiency.

To this end the invention contemplates directing the material which spills from the top portion of the belt, onto the lower portion thereof, from which it is automatically removed and returned to the top portion. This insures the delivering of the full quantity of material handled to the proper end of the belt.

The invention further consists of the novel arrangement, combination and construction of parts, as well as the novel steps in the method hereinafter described and shown in the accompanying drawing.

In the drawing:

Fig. 1 is a plan view of an assembly embodying the invention;

Fig. 2 is a sectional view along the line 2—2 of Fig. 1, and

Fig. 3 is a sectional view along the line 3—3 of Fig. 1.

Referring now to the embodiment shown in the drawing, there is illustrated at 1 and 2 pulleys around which pass an endless belt of any desired material, and comprising a top portion 3 and a bottom portion 4. Delivery spouts are shown at 5 as illustrating the point or points at which materials may be delivered to the belt. As shown in Fig. 2, the top and bottom portions of the belt may be dished.

As the belt travels around its pulleys there is a certain amount of vibration present, which when a pulverulent or other loose material is handled, will cause the same to spread toward the side edges of the belt. In actual practice it has been found that this vibration is sufficient to cause a considerable spillage particularly where a material of the nature of gypsum crystals is handled. In order to prevent the spilled material from dropping to the floor, guides 6 are provided which extend between the top and bottom portions of the belt. These guides may conveniently take the form of boards or the like mounted upon a framework 7 and extending the entire length of the belt or along those portions where most of the spillage occurs.

In order to reduce the amount of spillage to a minimum there may be provided built up sides 8 for the top portion of the belt in fairly close contact with the upper surface thereof. These sides may conveniently consist of boards mounted upon the same framework which supports the guides 6.

From inspection of Fig. 2 it will be seen that the built up sides 8 will be sufficient to restrict the major portion of the material being conveyed, to the area of the top portion of the belt, but any loose material finding its way between the bottom of the sides 8 and the top portion of the belt 3 will fall upon the guides 6 and be directed upon the lower portion of the belt 4.

In order to return the spilled material to the top portion of the belt there may be provided at one end of the assembly a diagonal scraper 9 located transversely of the bottom portion of the belt so that as the belt travels beneath the same the material thereon will be removed therefrom and directed into a pit or sump 10 provided for the purpose. It may be found convenient to pass that portion of the belt 4 in contact with the scraper 9 over a table 11 or the like to straighten out the dished configuration of the belt. This reduces the amount of material passing beneath the scraper to a minimum.

A conveyor consisting of a series of buckets 12 carried by an endless chain 13 passing around pulleys 14 and 15 removes the accumulated material in the pit 10 and deposits the same upon the top portion of the belt 3. In this manner the spilled material is automatically returned to the top portion of the belt and is conveyed to any desired location.

It is to be noted that in addition to preventing the loss of material by spillage, the invention increases the capacity of the belt for material handled. This is due principally to the provision of the built up sides 8.

The amount of material spilled onto the lower portion of the belt and removed therefrom is small. It may not be necessary to provide means such as the elevator to continuously return the material to the top portion of the belt. It may be desirable in certain instances to periodically shovel or return in any desired manner this accumulated material to the belt.

While the invention has been shown and described with particular reference to a workable combination, yet it is to be understood that it is not to be limited thereto but is to be construed only by the scope of the claims.

What I claim is:

1. In combination, an endless belt having parallel top and bottom portions, stationary guides extending between the top and bottom portions to direct material spilled from the top to the bottom portions, means to remove the material from the bottom portion, and means to return the same to the top portion.

2. In combination, an endless imperforate belt having parallel top and bottom portions, the top portion having built up sides to reduce spillage of material handled by the belt to a minimum, and guides extending between the top and bottom portions to direct material spilled from the top to the bottom portion.

3. In combination, an endless belt having parallel top and bottom portions, the top portion having built up sides to reduce spillage of material handled by the belt to a minimum, guides extending between the top and bottom portions to direct material spilled from the top to the bottom portion, and means to return the material from the bottom portion to the top portion.

4. In combination, an endless belt having parallel top and bottom portions, the top portion having built up sides to reduce spillage of material handled by the belt to a minimum, guides extending between the top and bottom portion to direct material spilled from the top to the bottom portion, means to remove the material from the bottom portion to a pit, and means to return the material collected in the pit to the top portion.

5. In combination, an endless belt having parallel top and bottom portions, stationary guides extending between the top and bottom portions to direct material spilled from the top to the bottom portion, and means to return the material from the bottom portion to the top portion, said means including a conveyer for collecting the spilled material and elevating the same above and depositing it upon the top portion.

6. In combination, an endless belt having parallel top and bottom portions, stationary guides extending between the top and bottom portions to direct material spilled from the top to the bottom portion, means to remove the material from the bottom portion, and means to return the same to the top portion, said removal means including a scraper located transversely of the bottom portion.

7. In combination, an endless belt having parallel top and bottom portions, stationary guides extending between the top and bottom portions to direct material spilled from the top to the bottom portion, means to remove the material from the bottom portion, and means to return the same to the top portion, said removal means including a scraper located diagonally across the bottom portion.

8. In combination, an endless belt having parallel top and bottom portions, stationary built up sides on the top portion to reduce spillage of material to a minimum and to increase the belt-carrying capacity, guides extending between the top and bottom portions of the belt to direct material spilled from the top portion onto the bottom portion, a diagonal scraper located transversely of the lower portion of the belt to remove material therefrom, a pit to receive the said material, and a conveyer to collect the material from the pit and elevate the same above and deposit it upon the top portion.

In testimony whereof, I have hereunto subscribed my name this 24th day of September, 1929.

JAMES P. CANNON.